US012670037B2

(12) United States Patent
Walls et al.

(10) Patent No.: US 12,670,037 B2
(45) Date of Patent: Jun. 30, 2026

(54) DYNAMIC OPTIMIZATION OF RESOURCES IN STORAGE SYSTEMS

(71) Applicant: INTERNATIONAL BUSINESS MACHINES CORPORATION, Armonk, NY (US)

(72) Inventors: Andrew D. Walls, San Jose, CA (US); Sandeep Ramesh Patil, Pune (IN); William J. Scales, Fareham (GB); Ramakrishna Vadla, Hyderabad (IN); Rahul M. Fiske, Aundh (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 18/649,113

(22) Filed: Apr. 29, 2024

(65) Prior Publication Data

US 2025/0335268 A1 Oct. 30, 2025

(51) Int. Cl.
*G06F 9/50* (2006.01)
*G06F 1/20* (2006.01)
*G06F 11/34* (2006.01)

(52) U.S. Cl.
CPC ............ *G06F 9/5094* (2013.01); *G06F 1/206* (2013.01); *G06F 9/5016* (2013.01); *G06F 11/3433* (2013.01)

(58) Field of Classification Search
CPC .. G06F 11/3433; G06F 1/3275; G06F 1/3268; G06F 1/3221; G06F 1/206; G06F 2209/5019; G06F 9/4893; G06F 9/5094; Y02D 10/00
See application file for complete search history.

(56) References Cited

U.S. PATENT DOCUMENTS

| | | | |
|---|---|---|---|
| 7,702,931 B2 * | 4/2010 | Goodrum | G06F 1/3203 |
| | | | 713/320 |
| 7,818,594 B2 * | 10/2010 | Gorbatov | H05K 7/1498 |
| | | | 700/32 |
| 9,037,880 B2 | 5/2015 | Doddavula | |

(Continued)

OTHER PUBLICATIONS

Arshad, "Utilizing power consumption and SLA violations using dynamic VM consolidation in cloud data centers", Elsevier, Jul. 7, 2022, 14 Pages.

(Continued)

*Primary Examiner* — Raymond N Phan
(74) *Attorney, Agent, or Firm* — Robert R. Aragona

(57) ABSTRACT

An embodiment for dynamic optimization of power consumption in storage systems is provided. The embodiment may include receiving historical time-series data from one or more components in a data center. The embodiment may also include predicting one or more workload metrics of the one or more components during a pre-defined time range. The embodiment may further include identifying one or more required resources for the one or more components to handle the predicted one or more workload metrics during the pre-defined time range. The embodiment may also include in response to determining at least one component of the one or more components does not require a resource allocation increase during the pre-defined time range, executing a first action to scale down at least one first resource during the pre-defined time range.

20 Claims, 3 Drawing Sheets

(56)                    References Cited

U.S. PATENT DOCUMENTS

| | | | | |
|---|---|---|---|---|
| 11,275,429 | B2 | 3/2022 | Singh | |
| 12,008,401 | B2 * | 6/2024 | Harwani | G06F 3/0656 |
| 2007/0067657 | A1 * | 3/2007 | Ranganathan | G06F 1/206 |
| | | | | 713/320 |
| 2009/0254909 | A1 * | 10/2009 | Hanson | G06F 1/329 |
| | | | | 718/102 |
| 2009/0300386 | A1 * | 12/2009 | Archer | G06F 1/3203 |
| | | | | 713/320 |
| 2011/0035072 | A1 * | 2/2011 | Jackson | G06F 9/5088 |
| | | | | 700/291 |
| 2013/0185415 | A1 * | 7/2013 | Schnier | G06F 9/505 |
| | | | | 709/224 |
| 2023/0195591 | A1 * | 6/2023 | Higginson | G06Q 10/04 |
| | | | | 702/186 |
| 2023/0273807 | A1 * | 8/2023 | Uppalapati | G06F 1/3206 |
| | | | | 718/1 |

OTHER PUBLICATIONS

Hassan, et al., "Integrated resource management pipeline for dynamic resource-effective cloud data center", Journal of Cloud Computing: Advances, Systems and Applications, 2020, pp. 1-20.
Leka, et al., "Workload Prediction of Virtual Machines Using Integrated Deep Learning Approaches over Cloud Data Centers" Springer Book: Human-Centric Smart Computing, Nov. 29, 2022, 11 Pages.
Wilson, "Understanding Power-Gating IT Equipment in Data Centers for Energy Efficiency" Nlyte Software, May 24, 2023, 3 Pages. https://www.nlyte.com/blog/understanding-power-gating-it-equipment-in-data-centers-for-energy-efficiency/.

* cited by examiner

100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

POWER OPTIMIZATION PROGRAM 150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

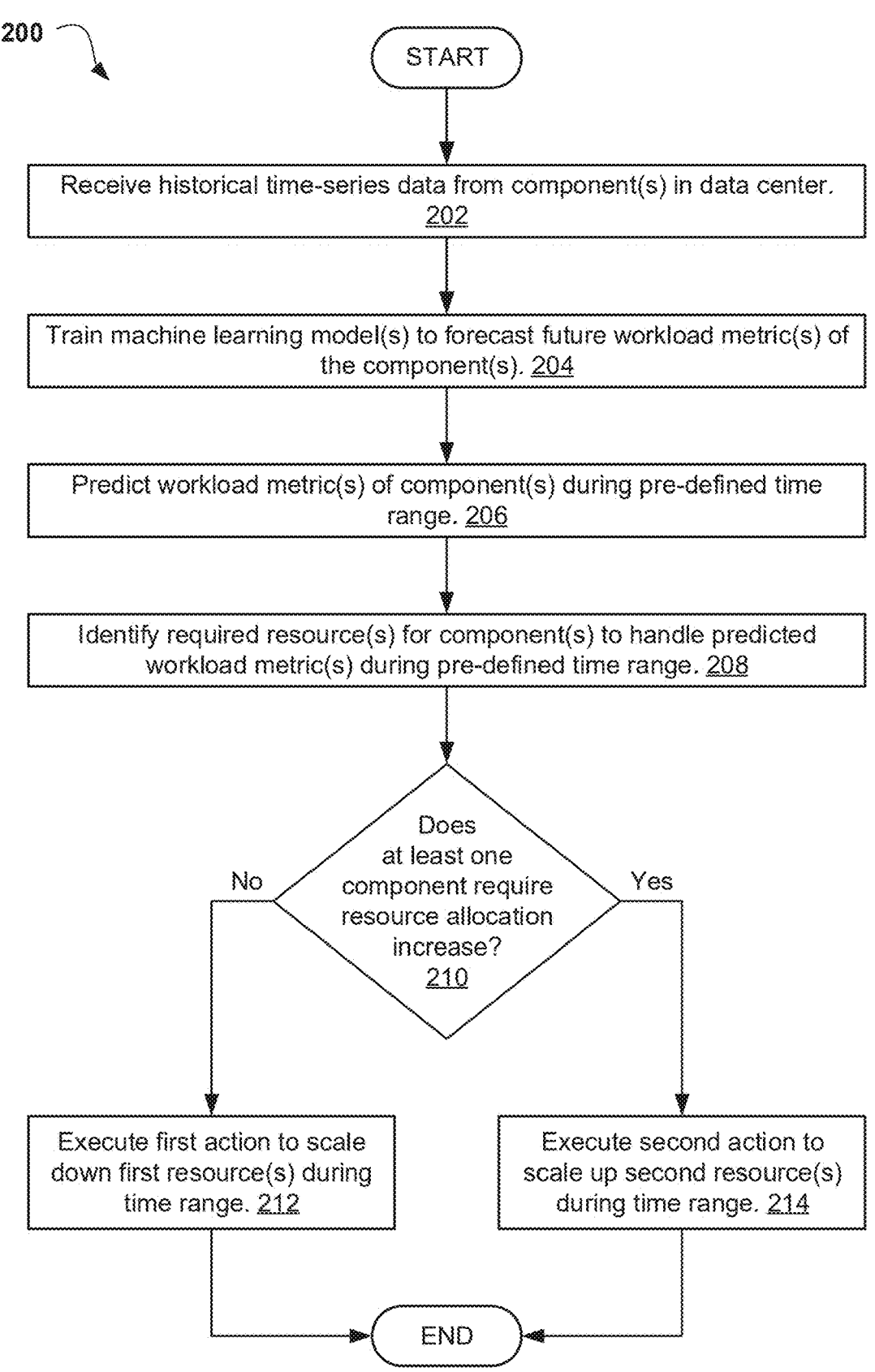

200

START

Receive historical time-series data from component(s) in data center.
202

Train machine learning model(s) to forecast future workload metric(s) of
the component(s). 204

Predict workload metric(s) of component(s) during pre-defined time
range. 206

Identify required resource(s) for component(s) to handle predicted
workload metric(s) during pre-defined time range. 208

Does
at least one
component require
resource allocation
increase?
210

No          Yes

Execute first action to scale
down first resource(s) during
time range. 212

Execute second action to
scale up second resource(s)
during time range. 214

END

FIG. 2

DYNAMIC OPTIMIZATION OF RESOURCES IN STORAGE SYSTEMS

BACKGROUND

The present invention relates generally to the field of computing, and more particularly to a system for dynamic optimization of power consumption in storage systems.

Storage systems play an important role in modern data centers, such as providing the infrastructure for storing and managing vast amounts of data. In light of the increasing demand for data storage, data centers are increasing efforts to reduce carbon emissions and operate in an eco-friendly manner. As data centers continue to see increased demand, sustainability has become a key consideration in storage system design and operation.

SUMMARY

According to one embodiment, a method, computer system, and computer program product for dynamic optimization of power consumption in storage systems is provided. The method, computer system, and computer program product may include receiving historical time-series data from one or more components in a data center. The method, computer system, and computer program product may also include predicting one or more workload metrics of the one or more components during a pre-defined time range based on the historical time-series data. The method, computer system, and computer program product may further include identifying one or more required resources for the one or more components to handle the predicted one or more workload metrics during the pre-defined time range. The method, computer system, and computer program product may also include in response to determining at least one component of the one or more components does not require a resource allocation increase during the pre-defined time range based on the identified one or more required resources, executing a first action to scale down at least one first resource during the pre-defined time range.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computing environment according to at least one embodiment.

FIG. 2 illustrates an operational flowchart for dynamic optimization of power consumption in storage systems in a dynamic power optimization process according to at least one embodiment.

DETAILED DESCRIPTION

Figure 3:
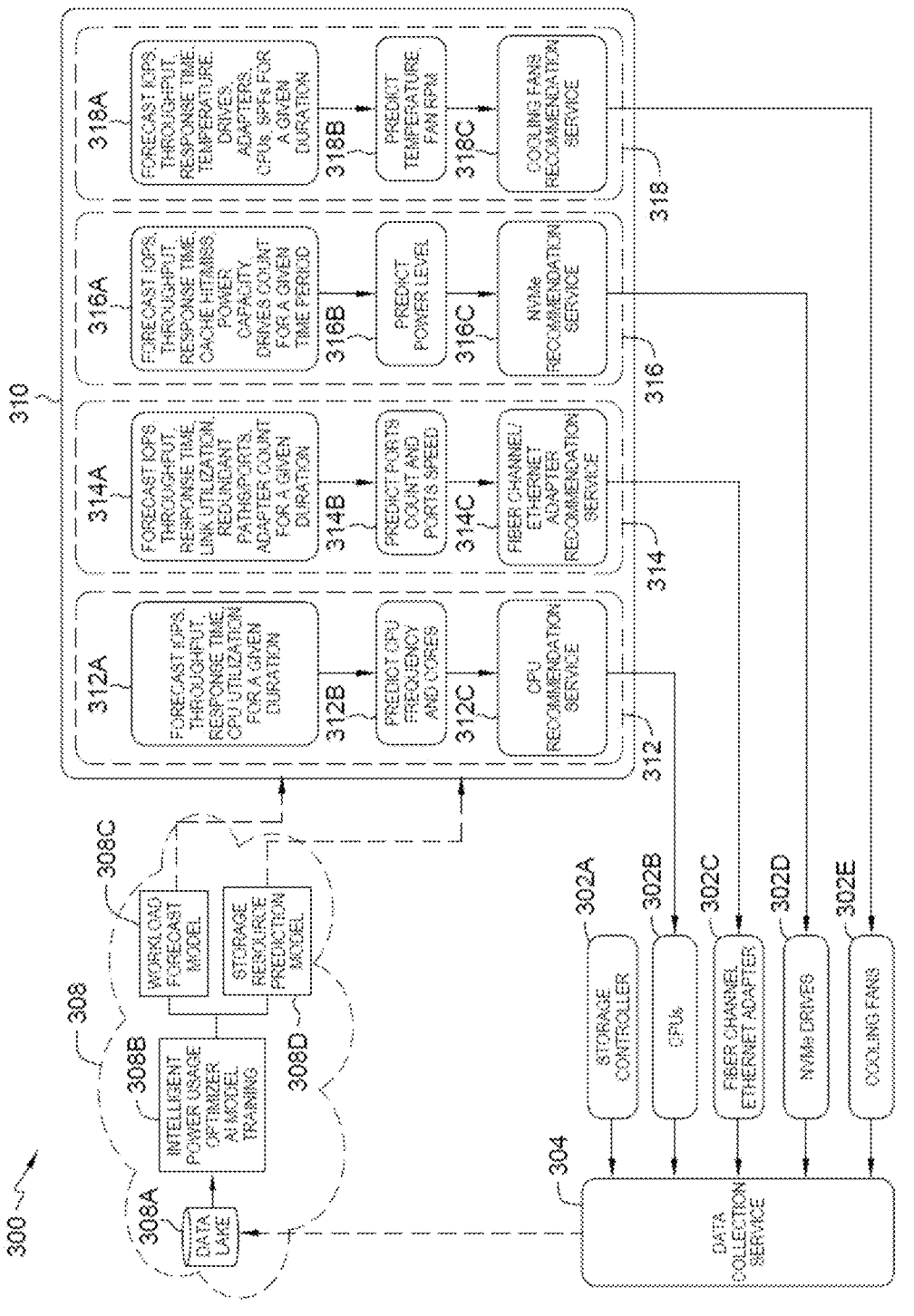
FIG. 3 is an exemplary diagram depicting an interaction between solution components of the process in FIG. 2 according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for dynamic optimization of power consumption in storage systems. The following described exemplary embodiments provide a system, method, and program product to, among other things, determine whether at least one component in a data center requires a resource allocation increase during a pre-defined time range based on an identified one or more required resources and, accordingly, execute a first action to scale down at least one first resource during the pre-defined time range in response to determining the at least one component does not require the resource allocation increase. Therefore, the present embodiment has the capacity to improve computers by dynamically optimizing power consumption.

As previously described, storage systems play an important role in modern data centers, such as providing the infrastructure for storing and managing vast amounts of data. In light of the increasing demand for data storage, data centers are increasing efforts to reduce carbon emissions and operate in an eco-friendly manner. As data centers continue to see increased demand, sustainability has become a key consideration in storage system design and operation. The data centers consume large amounts of energy to power and cool storage area network (SAN) equipment. This problem is typically addressed by powering down the equipment when power consumption reaches a certain threshold. However, merely powering down the equipment fails to account for surges in the workload.

It may, therefore, be imperative to provide a method, system, and computer program product for intelligently optimizing and reducing power dissipation in data centers. Thus, embodiments of the present invention may provide advantages including, but not limited to, dynamically optimizing power consumption, intelligently balancing energy efficiency with varying demands (e.g., seasonality), and preventing service disruptions. The present invention does not require that all advantages need to be incorporated into every embodiment of the invention.

According to at least one embodiment, when consuming power in a data center, historical time-series data from one or more components in the data center may be received in order to train one or more machine learning (ML) models to forecast one or more future workload metrics of the one or more components based on the historical time-series data. Upon training the one or more ML models, one or more workload metrics of the one or more components may be predicted during a pre-defined time range based on the historical time-series data and the trained one or more ML models so that one or more requires resources may be identified for the one or more components to handle the predicted one or more workload metrics during the pre-defined time range. According to at least one embodiment, in response to determining at least one component of the one or more components does not require a resource allocation increase during the pre-defined time range based on the identified one or more required resources, a first action may be executed to scale down at least one first resource during the pre-defined time range.

According to at least one other embodiment, in response to determining the at least one component does require the resource allocation increase, a second action may be executed to scale up at least one second resource during the pre-defined time range.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to determine whether at least one component in a data center requires a resource allocation increase during a pre-defined time range based on an identified one or more required resources and, accordingly, execute a first action to scale down at least one first resource during the pre-defined time range in response to determining the at least one component does not require the resource allocation increase.

Referring to FIG. 1, an exemplary computing environment 100 is depicted, according to at least one embodiment. Computing environment 100 contains an example of an environment for the execution of at least some of the computer code involved in performing the inventive methods, such as a power optimization program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102.

Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the power optimization program 150 may be a program capable of receiving historical time-series data from one or more components in a data center, determining whether at least one component in the data center requires a resource allocation increase during a pre-defined time range based on an identified one or more required resources, executing a first action to scale down at least one first resource during the pre-defined time range in response to determining the at least one component does not require the resource allocation increase, dynamically optimizing power consumption, intelligently balancing energy efficiency with varying demands, and preventing service disruptions. Furthermore, notwithstanding depiction in computer 101, the power optimization program 150 may be stored in and/or executed by, individually or in any combination, end user device 103, remote server 104, public cloud 105, and private cloud 106. The power optimization method is explained in further detail below with respect to FIG. 2. It may be appreciated that the examples described below are not intended to be limiting, and that in embodiments of the present invention the parameters used in the examples may be different.

Referring now to FIG. 2, an operational flowchart for dynamic optimization of power consumption in storage systems in a dynamic power optimization process 200 is depicted according to at least one embodiment. At 202, the power optimization program 150 receives the historical time-series data from the one or more components in the data center. As used herein, "data center" means a location where servers, storage systems, and/or storage area network equipment are stored. For example, the data center may be a location where server computers, such as remote server 104, are operating. The historical time-series may be defined by a user. For example, the historical time-series may be a period during the past two years.

The historical time-series data may include, but is not limited to: input/output operations per second (IOPS), read/write throughput, and response time of storage controllers; central processing unit (CPU) utilization, CPU frequency, and CPU cores count of CPUs; ports speed, ports count, adaptors count, and link utilization of fibre channel/ethernet adaptors; power level/utilization, cache hit/miss ratio, and drives count of non-volatile memory express (NVMe) drives; and system temperature, revolutions per minute (RPMs) of cooling fans, and a number of cooling fans. The one or more components may include, but are not limited to, the storage controllers, the CPUs, the fibre channel/ethernet adaptors, the NVMe drives, and/or the cooling fans.

Then, at 204, the power optimization program 150 trains the one or more ML models to forecast the one or more future workload metrics of the one or more components. The one or more future workload metrics are forecasted based on the historical time-series data.

According to at least one embodiment, two models may be created for predicting workload metrics of the one or more components and identifying one or more required resources to handle the predicted workload metrics. In particular, a workload forecaster model may receive as input the historical time-series data including, but not limited to, IOPS, read/write throughput, and response time of the storage controller. One or more AI models may be used to train the workload forecaster model. These models may include, but are not limited to, autoregressive integrated moving average (ARIMA), long short-term memory (LSTM), prophet, and/or linear regression. The best-fit AI model may then be used to forecast the workload metrics. The best-fit model may be determined by the mean squared error rate of each model. The model having a mean squared error rate closest to 0 may be the best-fit model. The workload forecaster model may forecast future values for the IOPS, the read/write throughput, and the response time.

Then, a storage resource prediction model may be fed as input the forecasted future values. One or more AI models may be used to train the storage resource prediction model. These models may include, but are not limited to, ARIMA, LSTM, random forest, and decision trees. The storage resource prediction model may be trained separately for each of the one or more components. The storage resource prediction model may predict the one or more required resources for the one or more components to handle the forecasted future values.

For example, for the CPUs, the input to the storage resource prediction model may be future values for the IOPS, the read/write throughput, the response time, and the CPU utilization. The output of the storage resource prediction model may be the required CPU frequency and the CPU cores' count. For the fibre channel/ethernet adapters, the input to the storage resource prediction model may be future values for the IOPS, the read/write throughput, the response time, the link utilization, redundant ports, and adapters' count. The output of the storage resource prediction model may be the required ports' count and ports' speed. For the NVMe drives, the input to the storage resource prediction model may be future values for the IOPS, the read/write throughput, the response time, the cache hit/miss ratio, the power capacity, and the drives' count. The output of the storage resource prediction model may be the required power level. For the cooling fans, the input to the storage resource prediction model may be future values for the IOPS, the read/write throughput, the response time, the system temperature, the drives' count, the adapters' count, the CPUs' count, and the small form-factor pluggable's count. The output of the storage resource prediction model may be the required cooling fans' RPMs and system temperature.

Next, at 206, the power optimization program 150 predicts the one or more workload metrics of the one or more components during the pre-defined time range. The one or more workload metrics are identified based on the historical time-series data. It may be appreciated that in embodiments of the present invention, the one or more future workload metrics forecasted during training may be the workload metrics at any point in the future, whereas the one or more workload metrics predicted during implementation may be the workload metrics during the pre-defined time range. The pre-defined time range may be a specific period in the future defined by the user. For example, the pre-defined time range may be a period within the next 12 months from a current date. Examples of the workload metric may include, but is not limited to, IOPS, read/write throughput, response time, CPU utilization, link utilization, redundant ports, adapters' count, cache hit/miss ratio, power capacity, drives' count, system temperature, CPUs' count, and small form-factor pluggable's count. These workload metrics may be predicted for the pre-defined time range.

For example, within the next 12 months, the IOPS during the holiday season may be 150 IOPS, whereas the IOPS the following month may be 100 IOPS. The CPU utilization during the holiday season may be 50% utilization, whereas the CPU utilization the following month may be 20% utilization. The cache hit/miss ratio during the holiday season may be 50%, whereas the cache hit/miss ratio the following month may be 80%. The examples described above illustrate at least some of the workload metrics that could be predicted by the power optimization program 150.

Then, at 208, the power optimization program 150 identifies the one or more required resources for the one or more components to handle the predicted one or more workload metrics during the pre-defined time range. Examples of the required resource may include, but is not limited to, required CPU frequency, CPU cores' count, ports' count, ports' speed, NVMe drives' power level, cooling fans' RPMs, and system temperature.

For example, when the IOPS during the holiday season is 100 IOPS, the required CPU frequency may be 6 GHz, whereas when the IOPS the following month may be 4 GHz. When the CPU utilization during the holiday season is 50% utilization, the required CPU cores' count may be 5 CPU cores, whereas when the CPU utilization the following month is 20% utilization, the required CPU cores' count may be 3 CPU cores. When the cache hit/miss ratio during the holiday season is 50%, the required NVMe drives' power level may be 8.5 Watts (W), whereas when the cache hit/miss ratio the following month is 80%, the required NVMe drives' power level may be 3.5 W. The examples described above illustrate at least some of the required resources that could be identified by the power optimization program 150.

Next, at 210, the power optimization program 150 determines whether the at least one component of the one or more components requires the resource allocation increase during the pre-defined time range. The determination is made based on the identified one or more required resources.

According to at least one embodiment, the power optimization program 150 may compare an active set of CPU cores with the required number of CPU cores during the pre-defined time range. When the required number of CPU cores is less than the number of active CPU cores, the determination may be made that the CPU cores do not require the resource allocation increase. Additionally, the power optimization program 150 may compare the frequency of the active set of CPU cores with the required frequency of the CPU cores during the pre-defined time range. When the required frequency of the CPU cores is less than the frequency of the active set of CPU cores, the determination may be made that the CPU cores do not require the resource allocation increase. Contrarily, when the required number of CPU cores is greater than the number of active CPU cores, the determination may be made that the CPU cores do require the resource allocation increase. Additionally, when the required frequency of the CPU cores is greater than the frequency of the active set of CPU cores, the determination may be made that the CPU cores do require the resource allocation increase.

According to at least one other embodiment, the power optimization program 150 may compare an active set of the fibre channel/ethernet ports with the required number of the fibre channel/ethernet ports during the pre-defined time range. When the required number of the fibre channel/ethernet ports is less than the number of active fibre channel/ethernet ports, the determination may be made that the fibre channel/ethernet ports do not require the resource allocation increase. Additionally, the power optimization program 150 may compare the port speed of the active set of fibre channel/ethernet ports with the required port speed of the fibre channel/ethernet ports during the pre-defined time range. When the required port speed of the fibre channel/ethernet ports is less than the port speed of the active fibre channel/ethernet ports, the determination may be made that the fibre channel/ethernet ports do not require the resource allocation increase. Contrarily, when the required number of the fibre channel/ethernet ports is greater than the number of active fibre channel/ethernet ports, the determination may be made that the fibre channel/ethernet ports do require the resource allocation increase. Additionally, when the required port speed of the fibre channel/ethernet ports is greater than the port speed of the active fibre channel/ethernet ports, the determination may be made that the fibre channel/ethernet ports do require the resource allocation increase.

According to at least one further embodiment, the power optimization program 150 may compare the active NVMe drives with the required number of NVMe drives during the pre-defined time range. When the required number of the NVMe drives is less than the number of active NVMe drives, the determination may be made that the NVMe drives do not require the resource allocation increase. Additionally, the power optimization program 150 may compare the active NVMe drives' power level with the required NVMe drives' power level during the pre-defined time range. When the required NVMe drives' power level is less than the active NVMe drives' power level, the determination may be made that the NVMe drives do not require the resource allocation increase. Contrarily, when the required number of the NVMe drives is greater than the number of active NVMe drives, the determination may be made that the NVMe drives do require the resource allocation increase. Additionally, when the required NVMe drives' power level is greater than the active NVMe drives' power level, the determination may be made that the NVMe drives do require the resource allocation increase.

According to at least one other embodiment, the power optimization program 150 may compare the active cooling fan speed with the required cooling fan speed during the pre-defined time range. When the required cooling fan speed is less than the active cooling fan speed, the determination may be made that the cooling fans do not require the resource allocation increase. Additionally, the power optimization program 150 may compare the current system temperature with the required system temperature during the pre-defined time range. When the required system temperature is greater than the current system temperature, the determination may be made that the cooling fans do not require the resource allocation increase. Contrarily, when the required cooling fan speed is greater than the active cooling fan speed, the determination may be made that the cooling fans do require the resource allocation increase. Additionally, when the required system temperature is less than the current system temperature, the determination may be made that the cooling fans do require the resource allocation increase.

In response to determining the at least one component does not require the resource allocation increase (step 210, "No" branch), the dynamic power optimization process 200 proceeds to step 212 to execute the first action to scale down the at least one first resource during the pre-defined time range. In response to determining the at least one component does require the resource allocation increase (step 210, "Yes" branch), the dynamic power optimization process 200 proceeds to step 214 to execute the second action to scale up the at least one second resource during the pre-defined time range.

Then, at 212, the power optimization program 150 executes the first action to scale down the at least one first resource during the pre-defined time range.

According to at least one embodiment, when the required number of CPU cores is less than the number of active CPU cores during the pre-defined time range, the power optimization program 150 may send a signal to at least one CPU core to power down the at least one CPU core. Additionally, when the required frequency of the CPU cores is less than the frequency of the active set of CPU cores during the pre-defined time range, the power optimization program 150 may send a signal to the at least one CPU core to lower the frequency of the at least one CPU core.

According to at least one other embodiment, when the required number of the fibre channel/ethernet ports is less than the number of active fibre channel/ethernet ports during the pre-defined time range, the power optimization program 150 may send a signal to at least one fibre channel/ethernet port to power down the at least one fibre channel/ethernet port. Additionally, when the required port speed of the fibre channel/ethernet ports is less than the port speed of the active fibre channel/ethernet ports during the pre-defined time range, the power optimization program 150 may send a signal to the at least one fibre channel/ethernet port to slow the speed of the at least one fibre channel/ethernet port.

According to at least one further embodiment, when the required number of the NVMe drives is less than the number of active NVMe drives during the pre-defined time range, the power optimization program 150 may send a signal to at least one NVMe drive to power down the at least one NVMe drive. Additionally, when the required NVMe drives' power level is less than the active NVMe drives' power level during the pre-defined time range, the power optimization program 150 may send a signal to the at least one NVMe drive to reduce the power level of the at least one NVMe drive.

According to at least one other embodiment, when the required cooling fan speed is less than the active cooling fan speed during the pre-defined time range, the power optimization program 150 may send a signal to at least one cooling fan to slow a speed of the at least one cooling fan. Additionally, when the required system temperature is greater than the current system temperature during the pre-defined time range, the power optimization program 150 may send a signal to the at least one cooling fan to power down the at least one cooling fan.

Next, at 214, the power optimization program 150 executes the second action to scale up the at least one second resource during the pre-defined time range.

According to at least one embodiment, when the required number of CPU cores is greater than the number of active CPU cores during the pre-defined time range, the power optimization program 150 may send a signal to the at least one CPU core to power up the at least one CPU core. Additionally, when the required frequency of the CPU cores is greater than the frequency of the active set of CPU cores during the pre-defined time range, the power optimization program 150 may send a signal to the at least one CPU core to increase the frequency of the at least one CPU core.

According to at least one other embodiment, when the required number of the fibre channel/ethernet ports is greater than the number of active fibre channel/ethernet ports during the pre-defined time range, the power optimization program 150 may send a signal to the at least one fibre channel/ethernet port to power up the at least one fibre channel/ethernet port. Additionally, when the required port speed of the fibre channel/ethernet ports is greater than the port speed of the active fibre channel/ethernet ports during the pre-defined time range, the power optimization program 150 may send a signal to the at least one fibre channel/ethernet port to increase the speed of the at least one fibre channel/ethernet port.

According to at least one further embodiment, when the required number of the NVMe drives is greater than the number of active NVMe drives during the pre-defined time range, the power optimization program 150 may send a signal to the at least one NVMe drive to power up the at least one NVMe drive. Additionally, when the required NVMe drives' power level is greater than the active NVMe drives' power level during the pre-defined time range, the power optimization program 150 may send a signal to the at least one NVMe drive to increase the power level of the at least one NVMe drive.

According to at least one other embodiment, when the required cooling fan speed is greater than the active cooling fan speed during the pre-defined time range, the power optimization program 150 may send a signal to the at least one cooling fan to increase the speed of the at least one cooling fan. Additionally, when the required system temperature is less than the current system temperature during the pre-defined time range, the power optimization program 150 may send a signal to the at least one cooling fan to power up the at least one cooling fan.

Referring now to FIG. 3, an exemplary diagram 300 depicting an interaction between solution components of the process in FIG. 2 is shown according to at least one embodiment. In the diagram 300, the one or more components may include the storage controller 302A, the CPUs 302B, the fibre channel/ethernet adapter 302C, the NVMe drives 302D, and the cooling fans 302E. A data collection service module 304 may receive the historical time-series data from the storage controller 302A, the CPUs 302B, the fibre channel/ethernet adapter 302C, the NVMe drives 302D, and the cooling fans 302E. The historical time-series data may then be sent to a cloud service 308, where the historical time-series data may be stored in a data lake 308A. The historical time-series data in the data lake 308A may be passed to an intelligent power usage optimizer AI training module 308B. The intelligent power usage optimizer AI training module 308B may train the workload forecast model 308C and a storage resource prediction model 308D. The output of the workload forecast model 308C and the storage resource prediction model 308D may be fed to an intelligent power usage optimizer module 310.

The intelligent power usage optimizer module 310 may host a CPU power optimizer module 312, a fibre channel/ethernet power optimizer module 314, a NVMe drive power optimizer module 316, and a cooling fan power optimizer module 318. The CPU power optimizer module 312 may include a first forecaster module 312A to forecast IOPS, throughput, response time, and CPU utilization workload metrics. The output of the first forecaster module 312B may be fed to a first resource prediction module 312B to predict the CPU frequency and the CPU cores. A CPU recommendation service module 312C may execute the first action or the second action.

The fibre channel/ethernet power optimizer module 314 may include a second forecaster module 314A to forecast IOPS, throughput, response time, link utilization, redundant paths/ports, and adapter count workload metrics. The output of the second forecaster module 314A may be fed to a second resource prediction module 314B to predict the ports' count and the ports' speed. A fibre channel, ethernet adapter recommendation service module may execute the first action or the second action.

The NVMe drive power optimizer module 316 may include a third forecaster module 316A to forecast IOPS, throughput, response time, cache hit/miss, power capacity, and drives' count workload metrics. The output of the third forecaster module 316A may be fed to a third resource prediction module 316B to predict the NVMe drive power level. A NVMe drive recommendation service module 316C may execute the first action or the second action.

The cooling fan power optimizer module 318 may include a fourth forecaster module 318A to forecast IOPS, throughput, response time, system temperature, drives' count, adapters' count, CPUs' count, and SPFs' count workload metrics. The output of the fourth forecaster module 318A may be fed to a fourth resource prediction module 318B to predict system temperature and cooling fan RPMs. A cooling fans recommendation service module 318C may execute the first action or the second action.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of dynamic optimization of resources in storage systems, the method comprising:
   receiving historical time-series data from one or more components in a data center;
   predicting one or more workload metrics of the one or more components during a pre-defined time range based on the historical time-series data, wherein the pre-defined time range is selected by a user;
   identifying one or more required resources for the one or more components to handle the predicted one or more workload metrics during the pre-defined time range selected by the user;
   determining whether at least one component of the one or more components requires a resource allocation increase during the pre-defined time range based on the identified one or more required resources; and
   in response to determining the at least one component does not require the resource allocation increase, executing a first action to scale down at least one first resource during the pre-defined time range.

2. The computer-based method of claim 1, further comprising:
   in response to determining the at least one component does require the resource allocation increase, executing a second action to scale up at least one second resource during the pre-defined time range.

3. The computer-based method of claim 2, further comprising:
   training one or more machine learning models to forecast one or more future workload metrics of the one or more components based on the historical time-series data, wherein the training further comprises:
      inputting the historical time-series data including input/output operations per second (IOPS), read/write throughput, and response time of a storage controller into a workload forecaster model, wherein the workload forecaster model forecasts future values for the input/output operations per second (IOPS), the read/write throughput, and the response time; and
      feeding the forecasted future values into a storage resource prediction model, wherein the storage resource prediction model predicts the one or more required resources for the one or more components to handle the forecasted future values.

4. The computer-based method of claim 2, wherein:
   executing the first action further comprises powering down at least one central processing unit (CPU) core in response to determining a required number of CPU cores is less than an active number of CPU cores during the pre-defined time range; and

executing the second action further comprises powering up the at least one CPU core in response to determining the required number of CPU cores is greater than the active number of CPU cores during the pre-defined time range.

5. The computer-based method of claim 2, wherein:

executing the first action further comprises slowing a speed of at least one ethernet port in response to determining a required ethernet port speed is less than an active ethernet port speed during the pre-defined time range; and executing the second action further comprises increasing the speed of the at least one ethernet port in response to determining the required ethernet port speed is greater than the active ethernet port speed during the pre-defined time range.

6. The computer-based method of claim 2, wherein:

executing the first action further comprises powering down at least one non-volatile memory express (NVMe) drive in response to determining a required number of NVMe drives is less than an active number of NVMe drives during the pre-defined time range; and executing the second action further comprises powering up the at least one NVMe drive in response to determining the required number of NVMe drives is greater than the active number of NVMe drives during the pre-defined time range.

7. The computer-based method of claim 2, wherein:

executing the first action further comprises slowing a speed of at least one cooling fan in response to determining a required cooling fan speed is less than an active cooling fan speed during the pre-defined time range; and executing the second action further comprises increasing the speed of the at least one cooling fan in response to determining the required cooling fan speed is greater than the active cooling fan speed during the pre-defined time range.

8. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving historical time-series data from one or more components in a data center;

predicting one or more workload metrics of the one or more components during a pre-defined time range based on the historical time-series data, wherein the pre-defined time range is selected by a user;

identifying one or more required resources for the one or more components to handle the predicted one or more workload metrics during the pre-defined time range selected by the user;

determining whether at least one component of the one or more components requires a resource allocation increase during the pre-defined time range based on the identified one or more required resources; and in response to determining the at least one component does not require the resource allocation increase, executing a first action to scale down at least one first resource during the pre-defined time range.

9. The computer system of claim 8, the method further comprising:

in response to determining the at least one component does require the resource allocation increase, executing a second action to scale up at least one second resource during the pre-defined time range.

10. The computer system of claim 9, the method further comprising:

training one or more machine learning models to forecast one or more future workload metrics of the one or more components based on the historical time-series data, wherein the training further comprises:

inputting the historical time-series data including input/output operations per second (IOPS), read/write throughput, and response time of a storage controller into a workload forecaster model, wherein the workload forecaster model forecasts future values for the input/output operations per second (IOPS), the read/write throughput, and the response time; and feeding the forecasted future values into a storage resource prediction model, wherein the storage resource prediction model predicts the one or more required resources for the one or more components to handle the forecasted future values.

11. The computer system of claim 9, wherein:

executing the first action further comprises powering down at least one central processing unit (CPU) core in response to determining a required number of CPU cores is less than an active number of CPU cores during the pre-defined time range; and executing the second action further comprises powering up the at least one CPU core in response to determining the required number of CPU cores is greater than the active number of CPU cores during the pre-defined time range.

12. The computer system of claim 9, wherein:

executing the first action further comprises slowing a speed of at least one ethernet port in response to determining a required ethernet port speed is less than an active ethernet port speed during the pre-defined time range; and executing the second action further comprises increasing the speed of the at least one ethernet port in response to determining the required ethernet port speed is greater than the active ethernet port speed during the pre-defined time range.

13. The computer system of claim 9, wherein:

executing the first action further comprises powering down at least one non-volatile memory express (NVMe) drive in response to determining a required number of NVMe drives is less than an active number of NVMe drives during the pre-defined time range; and executing the second action further comprises powering up the at least one NVMe drive in response to determining the required number of NVMe drives is greater than the active number of NVMe drives during the pre-defined time range.

14. The computer system of claim 9, wherein:

executing the first action further comprises slowing a speed of at least one cooling fan in response to determining a required cooling fan speed is less than an active cooling fan speed during the pre-defined time range; and executing the second action further comprises increasing the speed of the at least one cooling fan in response to determining the required cooling fan speed is greater than the active cooling fan speed during the pre-defined time range.

15. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving historical time-series data from one or more components in a data center;

predicting one or more workload metrics of the one or more components during a pre-defined time range based on the historical time-series data, wherein the pre-defined time range is selected by a user;

identifying one or more required resources for the one or more components to handle the predicted one or more workload metrics during the pre-defined time range selected by the user;

determining whether at least one component of the one or more components requires a resource allocation increase during the pre-defined time range based on the identified one or more required resources; and in response to determining the at least one component does not require the resource allocation increase, executing a first action to scale down at least one first resource during the pre-defined time range.

16. The computer program product of claim 15, the method further comprising:

in response to determining the at least one component does require the resource allocation increase, executing a second action to scale up at least one second resource during the pre-defined time range.

17. The computer program product of claim 16, the method further comprising:

training one or more machine learning models to forecast one or more future workload metrics of the one or more components based on the historical time-series data, wherein the training further comprises:

inputting the historical time-series data including input/output operations per second (IOPS), read/write throughput, and response time of a storage controller into a workload forecaster model, wherein the workload forecaster model forecasts future values for the input/output operations per second (IOPS), the read/write throughput, and the response time; and feeding the forecasted future values into a storage resource prediction model, wherein the storage resource prediction model predicts the one or more required resources for the one or more components to handle the forecasted future values.

18. The computer program product of claim 16, wherein:

executing the first action further comprises powering down at least one central processing unit (CPU) core in response to determining a required number of CPU cores is less than an active number of CPU cores during the pre-defined time range; and executing the second action further comprises powering up the at least one CPU core in response to determining the required number of CPU cores is greater than the active number of CPU cores during the pre-defined time range.

19. The computer program product of claim 16, wherein:

executing the first action further comprises slowing a speed of at least one ethernet port in response to determining a required ethernet port speed is less than an active ethernet port speed during the pre-defined time range; and executing the second action further comprises increasing the speed of the at least one ethernet port in response to determining the required ethernet port speed is greater than the active ethernet port speed during the pre-defined time range.

20. The computer program product of claim 16, wherein:

executing the first action further comprises powering down at least one non-volatile memory express (NVMe) drive in response to determining a required number of NVMe drives is less than an active number of NVMe drives during the pre-defined time range; and executing the second action further comprises powering up the at least one NVMe drive in response to determining the required number of NVMe drives is greater than the active number of NVMe drives during the pre-defined time range.

* * * * *